(No Model.)

W. C. JONES & W. S. ROGERS.
TRANSMITTING MOTION.

No. 387,235.      Patented Aug. 7, 1888.

Witnesses:

Willis C. Jones,
Winfield S. Rogers.
Inventors,
by James N. See,
Attorney.

UNITED STATES PATENT OFFICE.

WILLIS C. JONES AND WINFIELD S. ROGERS, OF CINCINNATI, OHIO.

TRANSMITTING MOTION.

SPECIFICATION forming part of Letters Patent No. 387,235, dated August 7, 1888.

Application filed November 23, 1887. Serial No. 255,954. (No model.)

*To all whom it may concern:*

Be it known that we, WILLIS C. JONES and WINFIELD S. ROGERS, of Cincinnati, Hamilton county, Ohio, have invented certain new and useful Improvements in Means for Transmitting Motion, of which the following is a specification.

This invention relates to mechanism to be employed in transmitting rotary motion from one part of machinery to another, and to serve as a means for altering the direction of motion and for graduating the speed and power transmitted.

Our invention will be readily understood from the following description, taken in connection with the accompanying drawings, in which—

Figure 1:
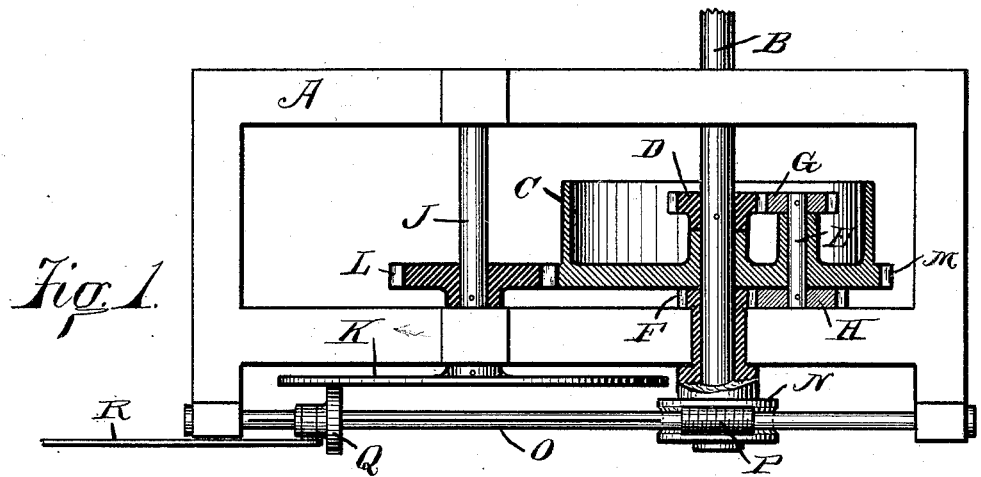
Figure 2:
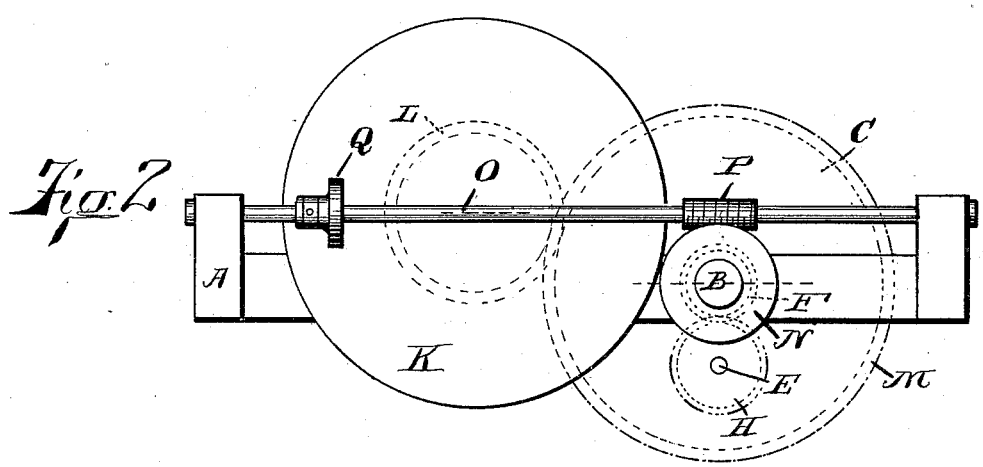

Figure 1 is a plan of a device illustrating our improvement, and Fig. 2 a front elevation of the same.

In the drawings, A indicates frame-work to serve in supporting the bearings of the movable parts; B, the main shaft, which shaft in the exemplification may be taken as the shaft to which motion is to be transmitted, the object of our invention being to permit the speed of rotation to be modified as desired and the direction of rotation to be changed at pleasure; C, a pulley loose upon the main shaft, which pulley may be taken as representing the prime moving rotating part—that is to say, this pulley is to be rotated, as by belt, continuously at a uniform rate of speed and continuously in one direction; D, a pinion fast on the main shaft; E, a planet-shaft journaled in the pulley C; F, a pinion loose upon the main shaft, this pinion being hereinafter termed the "loose center gear;" G, a planet-pinion fast on one end of the planet-shaft and gearing with pinion D; H, a pinion fast on the other end of the planet-shaft and gearing with the loose center gear; J, a secondary shaft; K, a friction-disk fast on the secondary shaft; L, a gear fast on the secondary shaft; M, a gear fast to the pulley C and gearing with the gear L, this gear M being illustrated as a toothed flange integrally formed with the pulley C; N, a worm-wheel integrally united to the loose center gear, F, with it, of course, loose upon the main shaft; O, a splined worm-shaft; P, a worm fast upon the worm-shaft and engaging the worm-wheel; Q, a bush-wheel splined to the worm-shaft, so as to be adjustable along the same, this bush-wheel engaging the face of the friction-disk K and being driven thereby; and R, a shifter illustrating means by which the bush-wheel may be shifted along the worm-shaft.

Reference is hereby made to United States Letters Patent No. 361,222, granted to us April 12, 1887, for improvements in gearing. That patent goes somewhat fully into the exposition of planetary gear system, knowledge of which will be found useful in analyzing the possibilities of the present device, which is based upon the same general mechanical principles.

Let it be noticed that the gears D G F H constitute a differential train. For the present let it be assumed that the worm P and the secondary shaft J and its accessories are absent from the device. Assume that the loose gear F is free to revolve in its bearing and upon the shaft, and that the shaft is clamped in its bearings, so as to resist rotation. Assume that continuous rotary motion is given to the pulley C, as by belt, at a speed of one hundred revolutions per minute. If the planetary gearing system were not differential—that is to say, if the gears F and D were of the same diameter—it is obvious that the center gear, F, would remain stationary, the planet-gears rotating as they revolved about the two stationary gears D and F, the gear D being stationary by reason of the main shaft being clamped; but the gearing is differential, and as a consequence a slow rotary motion will be imparted to the center gear, F. Assume, for an example, that it is found that under the circumstances indicated the center gear rotates at a rate of fifty revolutions per minute. Now, it is obvious that as the pulley revolves uniformly at one hundred revolutions per minute the speed of rotation of the center gear, F, is invariable so long as the main shaft remains stationary. If, by any means, while the parts are in motion we force the center gear, F, to revolve more than fifty revolutions per minute, it is obvious that the shaft will be rotated in a certain direction at a speed due to the rotations in excess of fifty per minute given to the center gear. On the other hand, if by any means we check the motion of the center gear, so that it makes less than fifty revolutions per minute, it is obvious that the main shaft must yield and rotate in an opposite direction at a rate of speed due to the deficit below fifty per minute in the rotation of the center gear, F. Therefore, assuming the main shaft to be free to rotate, and assuming that we can give to the center gear, F, any desired speed of rotation, it is obvious that we can hold the main shaft stationary by revolving the center gear at fifty revolutions per minute; that we can cause the main shaft to revolve in one direction at various speeds by accelerating the speed of the center gear, and that we can cause the main shaft to revolve in an opposite direction by retarding the center gear. Now comes something almost paradoxical. While the center gear, F, rotates fifty turns per minute the main shaft remains stationary. If we retard the center gear somewhat, the main shaft begins to revolve in a certain direction. If we retard the center gear still more, the main shaft increases its speed. Thus, if we turn the center gear forty-nine revolutions per minute, the main shaft revolves very slowly; at forty-eight, more rapidly; at ten revolutions, still more rapidly. Finally we carry the retardation to such a point that we hold the center gear stationary. The main shaft now revolves still more rapidly. We carry the retardation still further, so to speak, by actually turning the center gear, F, in an opposite direction. We have crossed the zero-mark of retardation for the center gear, and the effect is to still further accelerate the speed of the main shaft. The paradox rests in the fact that reversing the direction of rotation of the center gear does not reverse the direction of motion of the main shaft, but simply accelerates it.

It is obvious that as the pulley C rotates, the friction-disk K will be rotated, and that through the medium of the bush-wheel Q and worm P and worm-wheel N, the center gear, F, will be rotated. It will also be seen that by shifting the bush-wheel Q to different radial positions upon the friction-disk we can give to the center gear any desired speed of rotation within certain limits. It is also obvious that the direction of rotation of the center gear depends upon which side the axis of the friction-disk is engaged by the bush-wheel.

Assume that with the bush-wheel in the position indicated in the drawings, such speed and direction of rotation will be given to the center gear, F, as will completely neutralize the differential effect of the planetary-gear system while the pulley C is being revolved by the continuous application of power. It is obvious that under such circumstances the main shaft will not only be stationary, but will be locked stationary—that is to say, it cannot possibly be turned in either direction. If the bush-wheel be moved to the left, an increased speed will be given to the center gear and the main shaft will revolve very slowly. If the bush-wheel be moved to the right past the neutral point, the main shaft will revolve in an opposite direction and very slowly, by reason of the fact that the speed of the center gear has been lessened. If the bush-wheel be moved still farther to the right, the speed of the center gear will be still more lessened and the speed of the main shaft will be increased. If the bush-wheel be moved to the exact center of the friction-disk, the center gear, F, will be stationary and the main shaft will revolve still faster. If the bush-wheel be shifted still farther to the right, it will revolve the center gear, F, slowly in a reverse direction. Such reversal of direction of motion of the center gear is virtually an enhanced retardation of its motion, and the main shaft revolves still faster.

As one of the useful applications of our invention we would refer to a street-car driven by a high-speed electric motor. Our device offers means for transmitting the motion from the motor to the car-axle and for properly reducing the motion from the high-speed motor to the low-speed car-axle, and also for reversing the direction of motion of the car-axle without reversing the direction of rotation of the motor. Let the main shaft B be the car-axle. Let the car attendant, through the medium of shifter R or other suitable device, be able to adjust the bush-wheel along the worm-shaft. To stop the car, instead of applying brakes, he shifts the bush-wheel to that neutral position upon the disk which will give to the center gear a speed of rotation corresponding with a stationary main shaft. To move his car forward, he shifts the bush-wheel to the right and accelerates his speed gently and gradually. To back his car, he shifts the bush-wheel to the left of the neutral point.

We claim as our invention—

In mechanism for transmitting motion, the combination, substantially as set forth, with mechanism employing planetary gearing and a loose center gear, of a friction-disk arranged to be rotated from such mechanism, a splined shaft, a bush-wheel splined to and adjustable along said shaft and engaging such friction-disk, and means, substantially as set forth, for transmitting motion from such splined shaft to said loose center gear.

WILLIS C. JONES.
WINFIELD S. ROGERS.

Witnesses:
HARRY S. WORTHMAN,
S. B. DEAL.